United States Patent
Pfleger de Aguiar et al.

(10) Patent No.: US 11,328,067 B2
(45) Date of Patent: May 10, 2022

(54) SYSTEM AND METHOD FOR THREAT IMPACT CHARACTERIZATION

(71) Applicant: Siemens Aktiengesellschaft, Munich (DE)

(72) Inventors: Leandro Pfleger de Aguiar, Robbinsville, NJ (US); Arquimedes Martinez Canedo, Plainsboro, NJ (US); Sanjeev Srivastava, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 778 days.

(21) Appl. No.: 16/320,242

(22) PCT Filed: Aug. 24, 2016

(86) PCT No.: PCT/US2016/048374
§ 371 (c)(1),
(2) Date: Jan. 24, 2019

(87) PCT Pub. No.: WO2018/038718
PCT Pub. Date: Mar. 1, 2018

(65) Prior Publication Data
US 2019/0243977 A1 Aug. 8, 2019

(51) Int. Cl.
*G06F 21/00* (2013.01)
*G06F 21/57* (2013.01)
(Continued)

(52) U.S. Cl.
CPC ........... *G06F 21/577* (2013.01); *G05B 19/05* (2013.01); *G05B 19/058* (2013.01);
(Continued)

(58) Field of Classification Search
CPC .............. G06F 21/577; G06F 21/566; G06F 2221/034; G05B 19/05; G05B 19/058; G05B 2219/14006
(Continued)

(56) References Cited

U.S. PATENT DOCUMENTS 6,981,279 B1 * 12/2005 Arnold ................. G06F 21/566
714/28
8,135,567 B2 * 3/2012 Walacavage ......... G05B 19/056
700/32

(Continued)

FOREIGN PATENT DOCUMENTS

CN 101655699 A 2/2010
CN 102496309 A 6/2012
(Continued)

OTHER PUBLICATIONS

Guo, Chun-Mei et al:, "A Study on Network Security of Industrial Control System", China Academic Journal Electronic Publishing House, Dec. 31, 2013, 3 pgs., China.
(Continued)

*Primary Examiner* — Josnel Jeudy (57) ABSTRACT

A system and method is provided that facilitates threat impact characterization. The system may include a replica programmable logic controller (PLC) that corresponds to a production PLC in a production system and that may be configured to operate at an accelerated processing speed that is at least two times faster than a processing speed of the production PLC. The system may also include a data processing system configured to communicate with the replica PLC when executing malware infected PLC firmware and generate a simulation of the production system based on a virtual model of the production system operating at an accelerated processing speed that is at least two times faster than a processing speed of the physical production system.

(Continued)

The simulation may include accelerated simulation of the production PLC based on communication with the replica PLC using the malware infected PLC firmware. The data processing system may also monitor: outputs from the replica PLC and the simulation of the production system to determine a possible threat to a hardware component of the production system caused by the production PLC executing the infected PLC firmware rather than a non-infected PLC firmware; and output data indicative of the possible threat thorough a display device.

21 Claims, 6 Drawing Sheets

(51) Int. Cl.
    *G06F 21/56*            (2013.01)
    *G05B 19/05*            (2006.01)

(52) U.S. Cl.
    CPC .. *G06F 21/566* (2013.01); *G05B 2219/14006* (2013.01); *G06F 2221/034* (2013.01)

(58) Field of Classification Search
    USPC .......................................................... 726/25
    See application file for complete search history.

(56) References Cited

U.S. PATENT DOCUMENTS

| | | | |
|---|---|---|---|
| 8,474,040 B2 | 6/2013 | McRae | |
| 8,694,296 B2 * | 4/2014 | Kapoor | G05B 19/0426 703/2 |
| 2004/0184406 A1 | 9/2004 | Iwamura | |
| 2011/0209218 A1 | 8/2011 | McRae | |
| 2013/0198847 A1 | 8/2013 | Sampigethaya | |

FOREIGN PATENT DOCUMENTS

| | | |
|---|---|---|
| CN | 104503366 A | 4/2015 |
| EP | 2157488 A2 | 2/2010 |
| EP | 2940541 A2 | 11/2015 |

OTHER PUBLICATIONS

Porter, David, "Identity fraud: the stealth threat to UK plc", Computer Fraud & Security, Jul. 31, 2004, pp. 4-6, vol. 2004, Issue 7, ScienceDirect.
Cui et al.; "Defending Embedded Systems with Software Symbiotes"; Recent Advances in Intrusion Detection; 2011.
Canedo et al.; "Pipelining for cyclic control systems"; In Proceedings of the 16th Intl. Conf. on Hybrid systems: Computation and Control; 2013; pp. 223-232.
Wan et al.; "Model-based design of time-triggered real-time embedded systems for digital manufacturing", In Proceedings of the 18th International Conference on Hybrid Systems: Computation and Control; 2015; pp. 295-296.
Canedo et al.; "Towards parallel execution of IEC 61131 industrial cyber-physical systems applications"; In Proceedings of the Conference on Design, Automation and Test in Europe; 2012.
"57-Bus System (IEEE Test Case)"; Mar. 17, 2015; Retrieved from http://www.al-roomi.org/power-flow/57-bus-system.
Smith; "U.S. Risks National Blackout From Small-Scale Attack"; The Wall Street Journal; Mar. 12, 2014; Retrieved from http://www.wsj.com/news/articles/SB10001424052702304020104579433670284061220.
National Electric Sector Cybersecurity Organization Resource (NESCOR) Technical Working Group 1; "Electric Sector Failure Scenarios and Impact Analyses"; Sep. 2013; Retrieved from http://smartgrid.epri.com/doc/NESCOR%20failure%20scenarios09-13%20finalc.pdf.
PCT International Search Report and Written Opinion of International Searching Authority dated Apr. 26, 2017 corresponding to PCT International Application No. PCT/US2016/048374 filed Aug. 24, 2016.

* cited by examiner

SYSTEM AND METHOD FOR THREAT IMPACT CHARACTERIZATION

TECHNICAL FIELD

The present disclosure is directed, in general to programmable logic controllers (PLCs).

BACKGROUND

Security systems may monitor network activity and software in order to detect malware and cyber-attacks targeted against industrial and energy control systems. Security systems may benefit from improvements.

SUMMARY

Variously disclosed embodiments include data processing systems and methods that may be used to facilitate threat impact characterization of industrial and energy control systems. In one example, a system may comprise at least one replica programmable logic controller (PLC) that corresponds to a production PLC in a production system that includes a plurality of PLC controlled hardware components. The at least one replica PLC may be configured to operate at an accelerated processing speed that is at least two times faster than a processing speed of the production PLC in the production system. The system may also include at least one data processing system, including at least one processor configured to communicate with the at least one replica PLC when executing malware infected PLC firmware. The at least one data processing system may also generate a first simulation of the production system based on a virtual model of the production system operating at an accelerated processing speed that is at least two times faster than a processing speed of the physical production system. The first simulation may include accelerated simulation of the production PLC based on communication with the at least one replica PLC using the malware infected PLC firmware. The at least one data processing system may also monitor outputs from the at least one replica PLC and the first simulation of the production system to determine at least one possible threat to at least one hardware component of the production system caused by the production PLC executing the infected PLC firmware rather than a non-infected PLC firmware. Also the at least one data processing system may output data indicative of the at least one possible threat thorough at least one display device.

In another example, a method for threat impact characterization may comprise several acts carried out through operation of at least one processor of at least one data processing system. Such acts may include communicating with at least one replica PLC that corresponds to a production PLC in a production system that includes a plurality of PLC controlled hardware components, when the at least one replica PLC is executing malware infected PLC firmware while the at least one replica PLC is operating at an accelerated processing speed that is at least two times faster than a processing speed of the production PLC in the production system. The acts may also include generating a first simulation of the production system based on a virtual model of the production system operating at an accelerated processing speed that is at least two times faster than a processing speed of the physical production system, which first simulation includes accelerated simulation of the production PLC based on communication with the at least one replica PLC using the malware infected PLC firmware. The acts may also include monitoring outputs from the at least one replica PLC and the first simulation of the production system to determine at least one possible threat to at least one hardware component of the production system caused by the production PLC executing the infected PLC firmware rather than a non-infected PLC firmware. In addition, the acts may include outputting data indicative of the at least one possible threat thorough at least one display device.

A further example may include a non-transitory computer readable medium encoded with executable instructions (such as a software component on a storage device) that when executed, causes at least one processor to carry out this described method.

Another example may include an apparatus including at least one hardware, software, and/or firmware based processor, computer, component, controller, means, module, and/or unit configured for carrying out functionality corresponding to this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Various technologies that pertain to systems and methods that facilitate threat impact characterization will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Electric power grid systems may not be designed to withstand or quickly recover from damage inflicted simultaneously by a cyber-attack on multiple components. Such an attack could be carried out by knowledgeable attackers with little risk of detection or interdiction. Further well-planned and coordinated attacks by terrorists that knock out several substations, could leave an electric power grid system in a large region of a country at least partially disabled for many months.

In particular, one high risk hardware component is the electrical transformer. A systemic failure of targeted transformers may be a possible cyber warfare strategy, as transformers are costly and not easily replaced. For example, many transformers are custom built and may have long lead times for replacement or repair.

In an example cyber-attack scenario, a threat agent may carry out a man in the middle attack, hijacking the wireless communications channel to a substation transformer. The threat agent could use this capability to disable transformer cooling fans and overheat the device. Depending on the transformer and its controller, this could be done through a direct command or by drastically increasing oil temperature set points. This can lead to damage to critical substation transformer and loss of electrical power to customers.

Thus, the ability to quickly understand the intended impact of a cyber-attack in a complex inter-connected power system may be helpful in the overall threat characterization process. Unfortunately, even when detailed relevant, low-level control systems forensics data (e.g., recorded process data, control commands, content of system configuration changes) is available, identifying this intended impact may require manual analysis by experts who can understand at a deep level both, IT forensics and its translation into high-level domain (e.g., power grid domain) concepts (e.g., hardware components of the electrical system, demand/load side management).

Rapid characterization of advanced malware may not be possible or practical to achieve with techniques such as advanced static analysis, which may be too costly, time-consuming, and limited in terms of scalability. The domains of industrial and energy control systems are intrinsically heterogeneous and complex. Characterizing a threat in these domains may require deep knowledge from malware analysis and tool support to keep it manageable.

Example embodiments described herein are directed to solving the challenges to estimating the impact of sophisticated malware attacks on energy control systems or other industrial systems. An example embodiment may include a threat impact characterization system that is configured to automatically translate low-level forensics data into high-level impact characterization concepts suitable for forensic professionals to quickly understand the potentially inflicted or planned impact to the energy control system (and/or other industrial systems) by the malware attack. Such as system may carry out threat impact characterization that correlates performance indicators obtained via low level instrumentation from programmable logic controllers (PLC) to model past (via process historical data) and future (via simulation) predicted behaviors of a malware compromised energy control system or other industrial system.

Figure 1:
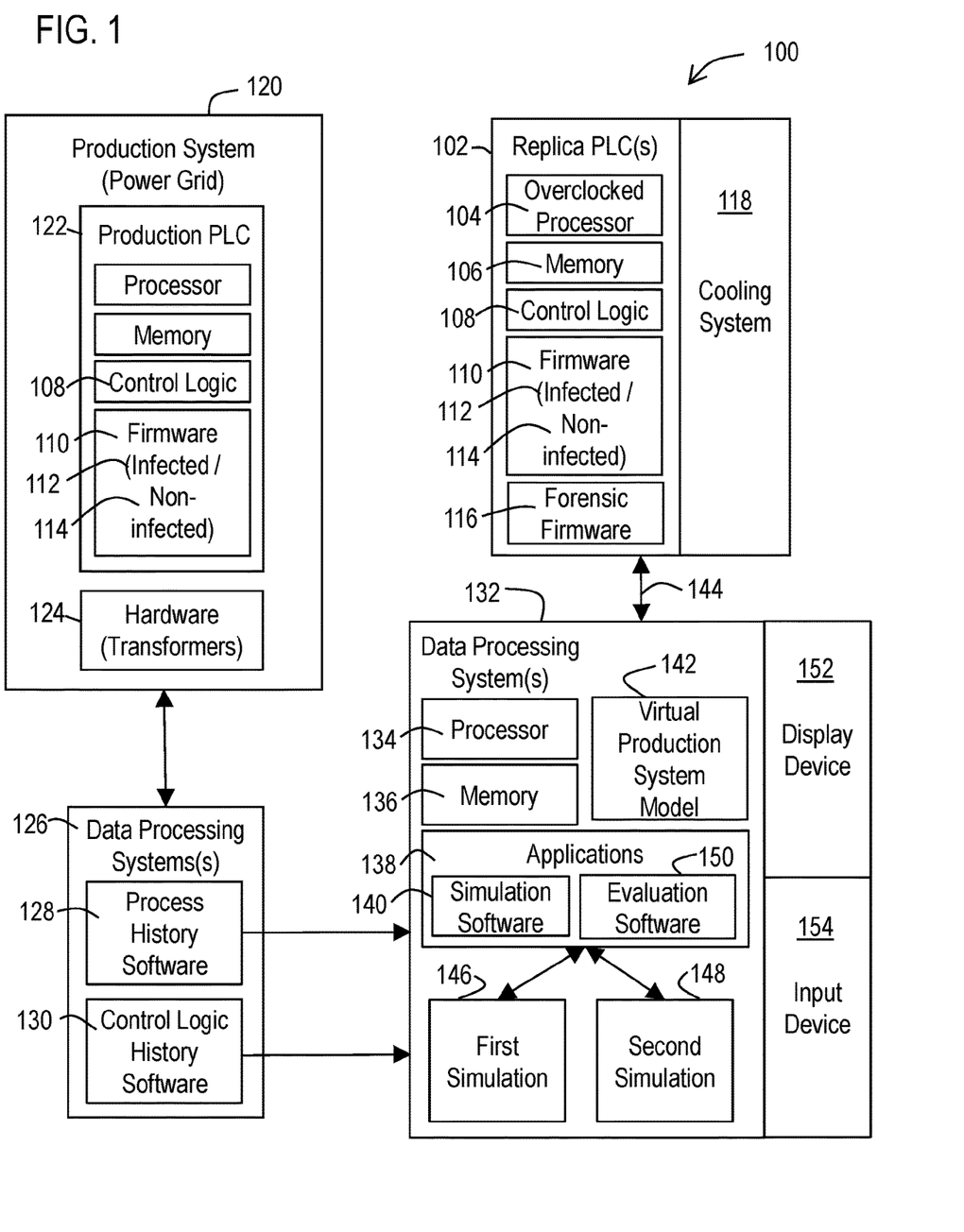
FIG. 1 illustrates a functional block diagram of an example system that facilitates threat impact characterization.

With reference to FIG. 1, a functional block diagram of an example system 100 is illustrated that facilitates threat impact characterization. The system may include at least one replica PLC 102 that includes a processor 104, memory 106, control logic code 108, and a firmware 110 corresponding to that from a production PLC 122 in a production system 120. Such a production system 120 may correspond to an energy control system (e.g., a power grid system) or other industrial system that uses PLCs to control and monitor hardware components 124 and processes. In this example, the replica PLC may correspond to an actual physical PLC (having a physical processor and memory). However, it should be understood that alternative embodiments may use a replica PLC that is emulated via software in a workstation, server, or a cloud environment.

The at least one replica PLC 102 may be configured to operate at an accelerated processing speed that is at least two times faster than a processing speed of the production PLC 102 when operating in the production system 120. For example, the PLC cycle time configuration may be shortened and/or the processor 104 (and optionally the memory 106 and other components) of the replica PLC may be overclocked to run faster. It should be appreciated that the accelerated processing speed may correspond to other speeds that are faster than the stock processing speeds of a PLC (when air cooled) such as 25% faster, 50% faster, three times faster, four times faster, or any other accelerated speed between, higher or lower than these values. It should also be appreciated that a replica PLC carried out via emulation may also be configured to operate at these described accelerated processing speeds.

When overclocking, an additional cooling system 118 may be added to the replica PLC 102 (compared to the production PLC 122) to dissipate the additional heat generated by the processor of the replica PLC. An example cooling system for the replica PLC may employ additional or larger heat sinks, liquid cooling (water or nitrogen), heat pipes, phase-change cooling, and/or any other processor based cooling techniques that enable the production PLC to operate faster than a stock production PLC as configured by the manufacturer. For example, the replica PLC 102 may be cooled via water, liquid nitrogen or other type of liquid cooling system that is capable of enabling the PLC to operate at processing speeds that are faster than the processing speed of the corresponding production PLC 122 operating in the production environment.

The example system 100 may further include at least one data processing system 132 (such as a server, workstation), including at least one processor 134, at least one memory 136, and one or more application software components 138. The data processing system 132 may be configured to interface with (i.e., receive communications from and send communications to) the at least one replica PLC (via a communication line 144) in order to mimic the manner in which the PLC interacts with the production environment. For example, the data processing system 132 may be configured via suitable software and hardware so to provide digital and analog inputs to the PLC that mimic data provided by sensors or other components to the production PLC. The data processing system 132 may also be configured to send control messages that direct the activities of the PLC.

In an example embodiment, the application software components 138 of the at least one data processing system 132 that interfaces with the replica PLC may include simulation software 140 that is executed by the at least one processor 134. An example of such simulation software 140 for use with simulating a power grid production system includes OPAL-RT power grid simulator provided by OPAL-RT Technologies of Montreal Canada. The simulation software 140 may be configured to model an actual electric grid system (i.e., the production system 120) and create a virtual grid model (i.e., a virtual production system model 142). This virtual grid model 142 may be used by the simulation software 140 to carry out one or more simulations 146, 148 of all or portions of the electrical power grid network (i.e., the production system 120). Such simulations 146, 148 may be carried out in a manner that includes at least one virtual PLC in the simulation that is controlled via communication over the communication link 144 with at least one physical replica PLC 102. Thus, the replica PLC is configured in this example to interface with other portions of the simulated electrical power grid in or to carry out the simulation of the production system.

In an example, the simulations 146, 148 of the virtual production system model 142 may be carried out by the simulation software 140 at an accelerated rate that corresponds to the accelerated processing speed of the at least one replica PLC. Thus the combination of the replica PLC 102 and the virtual production system model working as a set may generate data in an accelerated time frame that can be evaluated sooner (such as in half the time frame depending on the overclocking multiple used) than the real-time time frame of the physical production with the same configuration carrying out the same production tasks.

Such an accelerated simulation enables the described system 100 to be used to evaluate the effects of a malware infected PLC firmware compared to a non-infected PLC firmware in less time than with attempting to monitoring the effects of the malware infected PLC on an actual production system. The following description provides examples of how such a malware infected PLC firmware may be evaluated using a replica PLC. However, it should be understood that the principles and features described herein may also be used to evaluate other malicious modifications to a PLC using a replica PLC, including maliciously modified PLC system configuration, PLC memory blocks (e.g., FC, SFC, OB, DB) and/or any combination of maliciously modified firmware, memory, or configuration in a PLC.

For example, when a confirmed or suspected infected PLC firmware is detected in an actual production PLC in an actual production system (such as in a power grid system), such an infected firmware may be extracted from the production PLC and injected (i.e., installed) in the replica PLC. The data processing system may then be operated to execute a first simulation 146 of the production system operating at the accelerated processing speed that includes accelerated simulation of the production PLC based on communication with the replica PLC using the infected PLC firmware.

It should be appreciated that the virtual production system model carried out by the simulation software may be capable of producing process data streams corresponding to characteristics of the hardware components 124 of the production system and the process being carried out by the production system being simulated. Such process data streams may capture measurements from sensors and the manner in which hardware components are controlled via PLCs over time.

The application software components of the at least one data processing system may also include evaluation software 150 that is operative to evaluate the processes data streams produced by the first simulation. For example, the evaluation software may be configured to compare historical process data streams captured from the production system 120 to the data process streams produced by the first simulation 146 to determine differences between the process data streams that are indicative of the at least one possible threat to the production system.

In an example embodiment, the production system 120 may include one or more data processing systems 126 that include process history software 128 configured to capture and store process data streams from the production system and store them in one or more data stores. An example of such software includes SIMATIC Process Historian software produced by Siemens AG, Germany. However, it should be understood that example embodiments, may be configured to generate simulations from process data streams captured by other archival software and systems.

In addition, the production system 120 may be configured to enable the simulations described herein to operate responsive to sensor data coming from actual sensors in the production system in order to augment the forensic analysis with actual data acquired in an actual production system.

In an example embodiment, the production system 120 may include one or more data processing systems 126 that include control logic history software 128 configured to capture and store changes to control logic used by PLCs over time. The described simulation software 140 may be configured to generate the described simulations in which one or more PLCs operate according to the changes in the control logic history captured by the control logic history software 128 for the production system.

The at least one data processing system 132 may also be operated to execute a second simulation 148 of the production system operating at the accelerated processing speed that includes accelerated simulation of the production PLC based on communication with the replica PLC using the non-infected PLC firmware as well.

In an example embodiment, these first and second simulations using the same replica PLC but with different firmware (infected and non-infected) may be carried out sequentially. However, it should also be appreciated that the system may employ two (or more) replica PLCs, one with and one without an infected PLC. Thus, the data processing system (or two or more data processing systems) may carry out both the first and second simulations contemporaneously using respective first and second replicas in order to reduce the amount of time it takes to generate comparative data.

The evaluation software 150 may evaluates process data streams from the one or more replica PLCs and the first and second simulations of the production system to determine possible threats to the production system caused by the production PLC executing the infected PLC firmware rather than the non-infected PLC firmware. For example, the evaluation software may be configured to compare characteristics of virtual hardware components between the first and second simulations to determine deviations between the two simulations. Such deviations may correspond to deviations in temperature, pressure, speed, times, and/or any other characteristic of production system hardware for which the virtual production system model is capable of monitoring.

Such threats to the production system may correspond, for example, to damage to hardware components 124 of the production system, degradation to the process carried out by the production system, and/or degradation of the products produced by the production system. Thus, it should be appreciated that hardware components 124 associated with a threat may include the actual hardware that is controlled via the PLC (such as a coolant pump) as well as other hardware components that are not directly controlled by the PLC but can be threatened by the manner in which the firmware-infected PLC operates (e.g., components cooled via the coolant provided by the PLC controlled pump).

In addition or alternatively, the evaluation software may be configured to carry out a comparison of low level operational characteristics of the replica PLC between the first and second simulations to determine differences between the operational characteristics that may indicate a potential mechanism by which the production system can be threatened by the infected firmware.

To acquire such low level operational characteristics from the replica PLC, a forensic firmware code 116 may be injected into the at least one replica PLC. Such a forensic firmware code may be configured to monitor and provide operational data to the at least one data processing system 132 corresponding to the internal operation of the at least one replica PLC, without interfering with the operation of the infected PLC firmware 112 or non-infected PLC firmware 114.

Such a forensic firmware may be operative to monitor and capture data corresponding to internal operations of the PLC such as scan cycle time, jitter, automation tasks, hardware configuration, or any combination thereof. The evaluation software 150 may be configured to use the data provided by the forensic firmware code to determine possible threats to the production system.

In an example embodiment, the evaluation software 150 may be configured to carry out at least one comparison including comparing the outputs from at least one of: the first simulation to the second simulation; the at least one replica PLC when using the infected PLC firmware and the non-infected PLC firmware; or a combination thereof. The evaluation software 150 may also be configured to determine at least one difference in which at least one of the simulated production system, the at least one replica PLC, or a combination thereof operates between the first and second simulations, based on the at least one comparison. In addition, the evaluation software 150 may be configured to determine that at least one hardware component in the production system is associated with possible damage caused by the infected PLC firmware, based on the determined at least one difference.

The at least one data processing system 132 may be configured via the evaluation software to output indicia through a display device 152 (such as an LCD display screen) that outputs the results data indicative of the comparisons and determinations described herein. Such determinations may include which one of a plurality of hardware components 124 in the production system may experience or has experienced a threat (such as damage to the hardware component). Such data processing system may further be configured via the evaluation software to manipulate the data responsive to inputs from one or more input devices 154 (e.g., mouse, keyboard, touch screen).

In an example embodiment, the evaluation software 150 may generate a graphical user interface through the display device 152 that enables the user to tag data produced by the data processing system 132 as corresponding to a possible threat to the production system. Responsive to such tags, the at least one data processing system 132 may be configured to carry out further simulations that focus on the aspects of the production system that produce the tagged possible threats. For example, particular processes of the production system associated with the tagged possible threats may be executed in the first and second simulations system repeatedly to approximate the long term effects to hardware components in the production system caused by the infected firmware with respect to the tagged possible threats.

In addition, a forensic firmware 116 may be injected into the production PLC 122 that is operating in the production system. The outputs of the forensic firmware may be evaluated by the evaluation software to tag possible threats to the production system. The described simulations with the replica PLC may then be carried to accelerate the behaviors corresponding to the tagged possible threats to determine possible long-term effects that the malware infected firmware may have on the production system.

It should be understood that the data determined by the described system via the described simulations (and outputted through a display device) may reflect not only a threat to a particular hardware component of the production system, but may also illustrate the overall cyber-physical impact of the at least one possible threat on the production system. Further such an overall cyber-physical impact may be determined with respect to time and correspond to a timeline of the cyber-physical impact and/or may represent one or more consequences (or a chain of consequences of the cyber-physical impact over time).

For example, the system may be able to determine a threat to a particular type of hardware component, such as a pump. The system may also be able to determine how the operation of the pump (or other hardware) degrades over time and impacts the overall operation of the production system over time. For example, the initial degradation of the pump may cause it to move coolant or process liquids fast and faster over time. Such acceleration over time in the operation of the pump, may not only damage the pump, but may also damage other components in the system, alter a process for making a product, and/or lead to the shutdown of the entire production system or portions thereof. The described simulations may reveal each of these consequences over time, and the described system may be configured to output indicia representative of these consequences to the production system.

Figure 2:
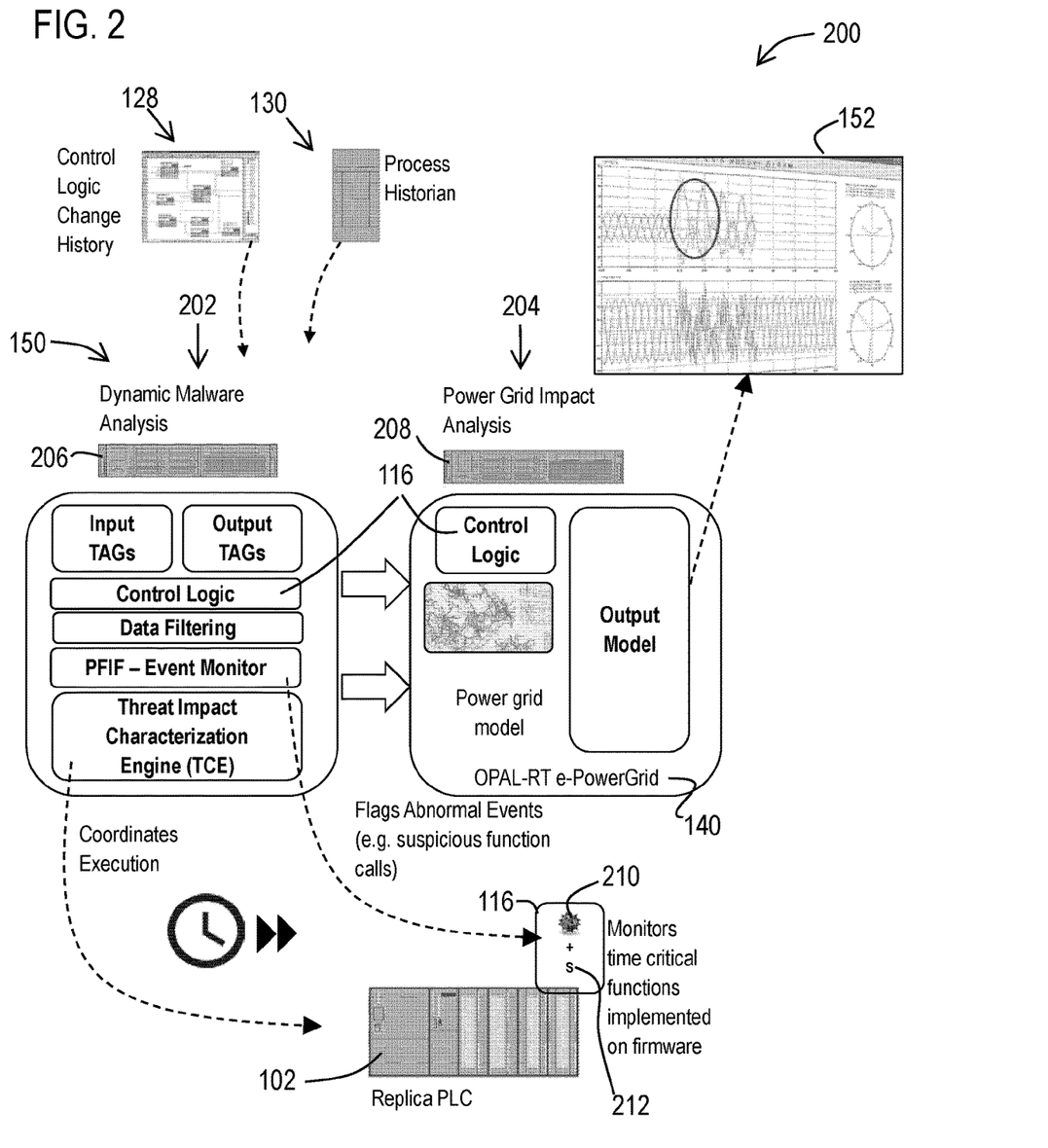
FIG. 2 illustrates a functional block diagram of an example implementation of the threat impact characterization system.

Referring now to FIG. 2, an example implementation of the described threat impact characterization system 200 is illustrated. In this example, the system 200 may include two components that carry out different aspects of the previously described evaluation software 150. These components may include: a dynamic malware analysis (DMA) software component 202 and a power grid impact analysis (PGIA) software component 204. The DMA component 202 may be configured to communicate with a PLC forensic monitoring injectable firmware code (PFIF code) 210, which correspond to a portion of the previously described forensic firmware 116 used to gather otherwise inaccessible information from PLCs. Because power grid systems are time-critical, the PFIF code may be configured to be non-intrusive for PLCs to meet the hard real-time requirements of these components. In this example, the replica PLC 102 may correspond to a commercial-of-the-shelf PLC that is representative of the types of PLCs used in the energy automation industry (such as the SIMATIC S7-1500 family of controllers or other PLCs supplied by Siemens Industrial Automation or any other PLC provider).

DMA component 202 may also be configured to use information from the process history software 130 (such as the Process Historian software) and the changelog/diffs from the control logic change history software 128 to carry out analyzing the threat from a malware infected firmware and its impact.

The PGIA component 204 may also use historical data from the process history software 130, communications with the replica PLC 102, and the control logic 108 from the suspected malware infected PLC to perform a past impact estimation (based on historical control logic in combination with the infected firmware) and a future impact estimation (based on current control logic in combination with the infected firmware). For both past and future impact estimation, the simulations may be generated using the previously described simulation software 140 (e.g. OPAL-RT power grid simulator) that simulates a power grid.

The DMA component 202 may be executed by data processing systems corresponding to PC/server-based hardware 206. However, in alternative embodiments, public or private cloud services may be used for hosting the DMA component. The main role of the DMA component may be to aggregate and correlate data prevenient from historical process data streams, control logic change history, and PFIF code provided data streams in order to identify critical discrepancies between a legitimate and a maliciously modified firmware in terms of the resulting impact to the power grid. However, it should be understood that the use of the wording dynamic malware analysis for the DMA component 202 is not intended to imply the delivery of all typical features and steps of a dynamic malware analysis (e.g., debugger, executable decompression) and an environment commonly used to investigate IT security malware events. Rather, the DMA may be focused on functionality to observe dynamic interactions, rather than disassembled code.

The PGIA component 204 may also be executed by data processing systems corresponding to PC/Server-based hardware 208 and/or servers that are capable of executing the simulation software 140. The PGIA may be configured to use the information from the DMA component in terms of PLC controlled outputs to simulate both the past and/or future effects to the power grid model during the execution of a given control logic code at a given point in time (with and without a maliciously modified firmware). Projected impactful scenarios with damage to the physical power grid hardware components such as transformers, circuit breakers or protection devices may be recorded to a data store to allow later confirmation by a forensics team of the conditions for a successful attack that potentially happened in the past or that might still occur in future.

The described system allows for the rapid correlation of industrial control system specific forensic evidence (process history, control logic changes, malicious firmware) in order to quickly identify catastrophic scenarios in regards to the potential attacker's intent to compromise the power system. The described system also enables selectively and quickly determining relevant time slots in the production environment that are indicative of threats to the production system.

In this described example, the PFIF code 210 (i.e., a portion of forensic firmware code 116) may correspond to a compiled binary PLC firmware code extract that can be injected seamlessly and later called when another portion of the forensic firmware (corresponding to a malware detection module 212) detects an anomaly in the PLC firmware (e.g., the presence of a malware infected firmware). Both the PFIF code 210 and the malware detection module 212 may operate independently of PLC firmware and may not interfere with the operation of the PLC firmware.

During normal operation of the PLC, the PFIF code may remain dormant in the PLC except for a lightweight event monitor. The PFIF code may be triggered by an anomaly event from the malware detection module 212 portion of the forensic firmware. The triggered PFIF code may then gather data from various performance indicators of the PLC (e.g., cycle time, load) and may send this forensics data to the DMA component. As is discussed below in more detail the PFIF code may be executed as part of the idle time in a scan cycle of a PLC to ensure that the real-time guarantees of the PLC are honored.

The PFIF code may be configured to gather low level forensics information from the PLC that is not available by standard PLC communications. The gathering of low level forensic information may also include creating statistics of timing/scheduler behavior and may include monitoring other time sensitive operations implemented at the firmware level. The delivery of the PFIF code for an implemented system 200 may include a binary injectable code extract (not the source code) that works on a selected version/model of the replica PLC.

Figure 3:
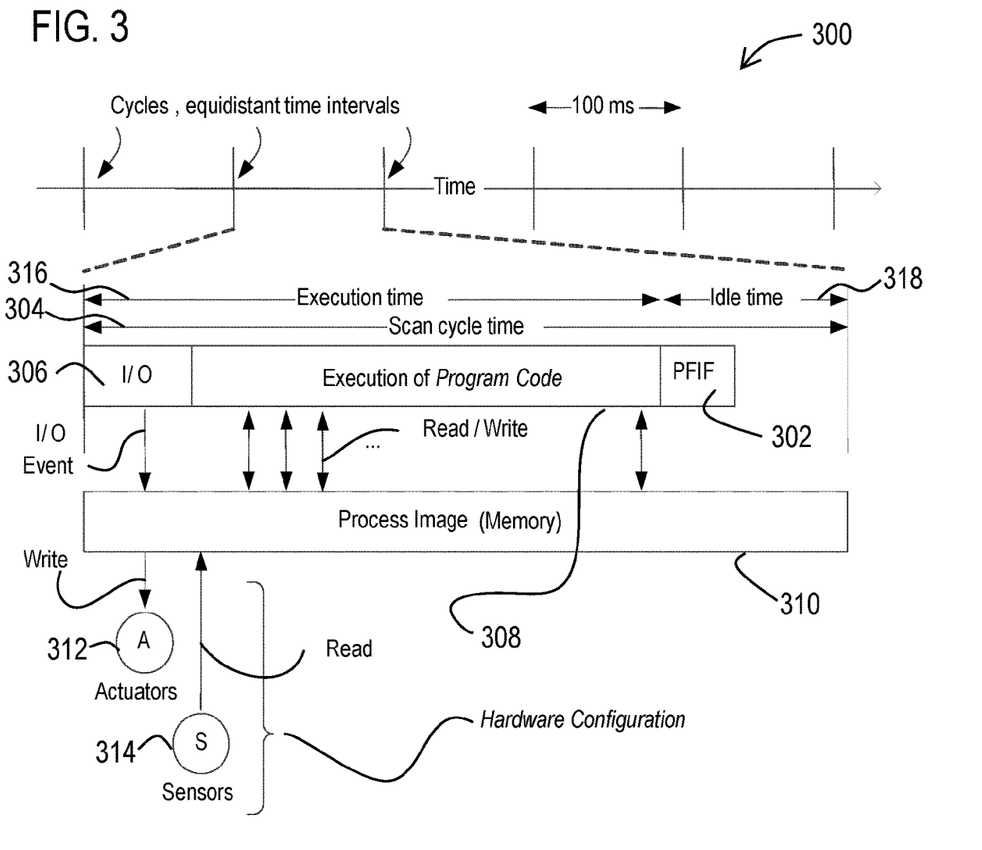
FIG. 3 illustrates a functional block diagram of an execution model of a replica PLC.

Referring now to FIG. 3, an execution model 300 for a replica PLC is illustrated. It should be understood that PLCs are hard real-time systems designed to interact with and control physical processes through sensors and actuators in pharmaceutical, manufacturing, energy, and automotive industries. The computation model of PLCs is typically based on control logic in the form of automation tasks that are equivalent to functions in general purpose programming languages. An automation task is the cyclic execution of a control program on regular and equidistant time intervals called cycles or scan cycle times 304. The scan cycle time may be user-configurable and its length is determined by the frequency of the physical system under control. Within a scan cycle, the typical PLC executes two logical actions: (1) Input/output (I/O) communications 306 from/to sensors and actuators, and (2) execution of the control logic program code 308. The I/O event triggers a write/read operations to the process image (PI) memory 310 to update the actuators 312 and read the state of the sensors 314, respectively that are controlled and monitored respectively by the PLC.

The PI is an addressable memory area that serves as the interface between the control system and the sensors 314 and actuators 213 connected to it and provides a "snapshot" of the states of the sensors and actuators. The PI is accessible throughout the execution of a cycle. The actual time required within a cycle to read inputs, write outputs, and execute the program code, is known as execution time 316. If the execution of the program code completes before the next cycle fires (i.e., the execution time 316 is less than the scan cycle time 304), the program is set into an idle state for an idle time 318. It should also be appreciated that the automation tasks carried out by the PLC can be generally programmed and configured in a large variety of programming languages such as IEC 61131-3.

The PLC firmware manages the PLC hardware to ensure that the computation model is compliant to real-time requirements. This includes that the I/O 306 and execution 308 stages are executed within the scan cycle time 304, interruption handling, network, and automation task preemption.

In an example embodiment, a PFIF code 302 may be configured to operate in the idle time 318 of the scan cycle time 304. The previously described DMA component may then monitor the performance parameters of the replica PLC at runtime to correlate the low-level forensics information provided by the PFIF code to PLC-specific behavior and generate high-level forensics information regarding the malware infected firmware.

In an example embodiment, the PFIF code may be configured to monitor the scan cycle time and jitter in the replica PLC. The scan cycle time may be a useful performance metric for the PLC because it determines its real-time characteristics. A delay in a scan cycle time is referred to as jitter. Jitter may be another useful performance metric for the PLC because any delays in the scan cycle time directly affects the accuracy and therefore the quality of control of the PLC. Malicious changes to any of these two parameters by a malware infected firmware could cause catastrophic consequences in the production system and therefore may be monitoring targets for PFIF code.

The PFIF code may also be configured to monitor automation task configuration in a PLC. The automation task configuration specifies parameters such as priority of the task, the scan cycle time, when it was compiled, downloaded on the PLC, and if there are any problems (e.g., exceeds the scan cycle time). The PFIF code may also be configured to monitor automation tasks, which are the program code (control logic) of the PLC. The PFIF code may monitor changes to the program code in order to detect less sophisticated types of attacks, such as when a malicious user injects new function blocks or data blocks in the PLC.

The PFIF code may also monitor the hardware configuration of the PLC. The hardware configuration corresponds to the type and number of other PLCs, sensors, actuators, I/O modules, and other hardware such as human-machine interfaces (HMI) in the Industrial Control System (ICS) network with which the PLC communicates. The PFIF code may monitor the hardware configuration to determine whether new equipment has been added or deleted from the industrial control system network for the PLC.

In an example embodiment of the described system, the DMA component may include a threat impact characterization engine that is configured to control and synchronize the overall data correlation process from multiple sources. As opposed to using dynamic malware analysis techniques, such as executable decompression and debugging, the DMA component may be configured to focus on the fast execution of the process inputs recorded by the process history software 128 with continuous monitoring of the corresponding process outputs from both, the recorded historical data, and the results of the execution of the provided control logic by the replica PLC with the malware infected firmware.

With this configuration, the DMA component may monitor and evaluate the interactions between the modified firmware, the different versions of potentially downloaded control logic, and the resulting generated process images of input (PII) and output (PIQ). During the execution, process data feeds from the PFIF code may be used by the DMA component to tag database time slots with high likelihood of containing security relevant events with potential impact to the production system (e.g., such as energy delivery power grid system). These tags may correspond to data that serves as checkpoints to instruct the PGIA component and/or the simulation software (for a virtual production system model) to compute impacts. It should be noted that the accelerated operation of the replica PLC enables the DMA component to operate at high speeds (which allows a large amount of process history data streams to be inspected, correlated and tagged) in order to enable the simulator software to selectively execute scenarios that are more likely to contain impactful changes.

As discussed previously, example embodiments may characterize threats to a production system such as an electrical power grid. In order to cope with an increasing load on the existing power grid systems, system controls have become "smarter" in order to compensate for the lowering of stability margins. Such smart system controls use increased amounts of automation and wide area communication over networks employing optical fiber and other high bandwidth media. Apart from the vulnerability of the hardware used in this process there is the increasing cyber threat to the communication networks themselves, whereby hackers may gain access to vital control and protection settings and commands. In order to understand the consequences of cyberattacks on power grid components and to develop and validate methods proposed here, the PGIA component 204 (described with respect to FIG. 2) may use a "virtual" electrical grid system (IEEE standard systems) to carry out one or more simulations of the operation of the power grid using the simulation software 140 (such as OPAL-RT power grid simulator).

The simulation software may have the capability to model an actual electric grid system and create a virtual grid model. Such a virtual grid model may be capable of simulating an electric power generation plant, step-up transmissions stations, high-voltage transmissions lines, step-down transmissions substations, distributions substations, transformers, residential/commercial/industrial loads, and/or other electrical systems that comprise an actual electrical power grid. This virtual grid model may be used to run the simulation of part of an electrical power network, which is controlled over a communication link by one or more replica PLCs. The previously described DMA component 202 and forensic firmware 116 may be used to monitor the replica PLCs while being used to control portions of the simulated virtual grid model.

The simulations carried out by the described system 200 may provide a realistic platform on which attack scenarios can be simulated to estimate what potential consequences in the system can be achieved. Models for different electrical equipment and systems may be developed using the simulation software, to enable the example system to carry out controller-hardware-in-the loop (CHIL) experiments with complex electrical systems. Replica PLCs can be operated and tested in the virtual models under conditions that very closely approximate the intended real-world application. The dynamic and transient impacts of malware infected PLCs on the virtual model may appear as a natural consequence of the CHIL experiments.

Further, as discussed previously, the simulation software may be capable of carrying out faster than real-time simulations, which means that the computation of the simulated system advances one simulated real-time moment in less time than the same moment would occur in an actual real-time system. As discussed previously, the replica PLCs interfacing with the simulations will likewise operate at a faster processing speed that corresponds to the faster processing speed of the simulations.

As discussed previously, the processor of a replica PLC may be overclocked and may be cooled with liquid cool system in order to keep up with the faster than real-time simulations. Such overclocking of the processor of the replica PLC may serve to shorten the scan cycle time of the PLC and cause the execution of program code, firmware, and forensic firmware to execute faster.

However, it should be appreciated that in other examples the PLC may be capable of operating faster without overclocking. For example, the scan cycle time of the replica PLC may be reduced to accelerate the real-time simulation into faster-than-real-time simulation while continuing to provide 100% code execution coverage.

Figure 4:
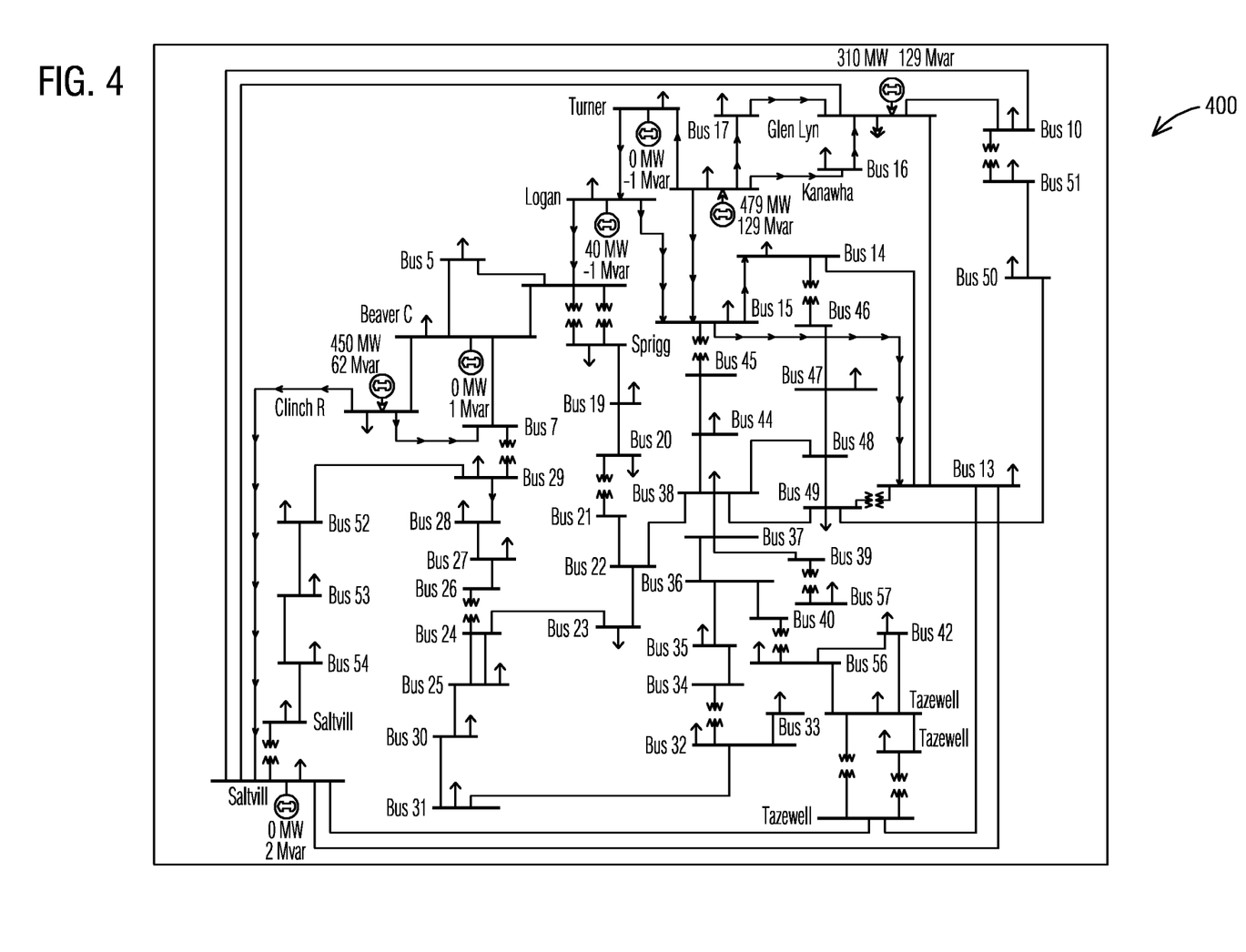
FIG. 4 illustrates an IEEE 57 bus system that approximates an American electrical power system.

An example of a power grid system that may be simulated for use with example embodiments includes an IEEE 57 bus system 400, which is illustrated in FIG. 4. The IEEE 57 bus system 400 represents an approximation of an American electric power system and includes 57 buses, 7 generators and 42 loads. At selected nodes/locations in a virtual model of this power grid system more detailed models of distribution feeders and protection and control devices that are installed in the electrical network or in the substations (transmission and distribution) may be included for the simulation. Examples of such devices that may be modeled in the simulation and controlled via replica PLCs include: PLC based generation plant controls; circuit-breakers; intelligent electronic devices (IEDs); relays; transformer controls; remote terminal units (RTUs); VOLT/VAR equipment along with controls; and distributed energy resources (DERs) along with controls. In some examples, the control of some protection devices may be interfaced directly to the simulation and other protection devices may be simulated in the simulation.

It should also be understood that the creators of malware infected firmware for PLCs may program the infected firmware to attempt to detect when the infected firmware is operating in a replica PLC. In such cases, the infected firmware may forgo activity that is intended to cause damage to a hardware component of a production system in order to make it more difficult for forensic experts to determine where possible damage to the production system may have occurred.

In order to counter such programming in a malware infected firmware, features of the replica PLC such as sensors on the PLC itself may be modified and/or fooled to prevent them from providing information indicative of the PLC being operated as the described replica PLC. For example, temperature sensors on the PLC may be modified so as to avoid indicating cooler temperatures indicative of liquid cooling of the processor such as via relocating the sensors to a warmer portion on the PLC and/or heating the sensors with a heat source to mimic the operating temperatures of a PLC operating in a production system environment. In a further example, the forensic firmware itself may modify sensor readings and/any other parameters in the memory of the PLC to be indicative of a production PLC rather than a replica PLC.

The previously described examples have focused on PLCs. However, it should be appreciated that production systems (such as a power grid) may include other types of controllers that may be maliciously modified in a manner similar to a PLC (e.g., via a malware infected firmware). Alterative embodiments of the described system may be carried out that include replica controllers corresponding to such production controllers in place of or in addition to the described replica PLC. An example of such a controller for which a replica controller may be used in the described system, includes a remote terminal unit (RTU).

Figure 5:
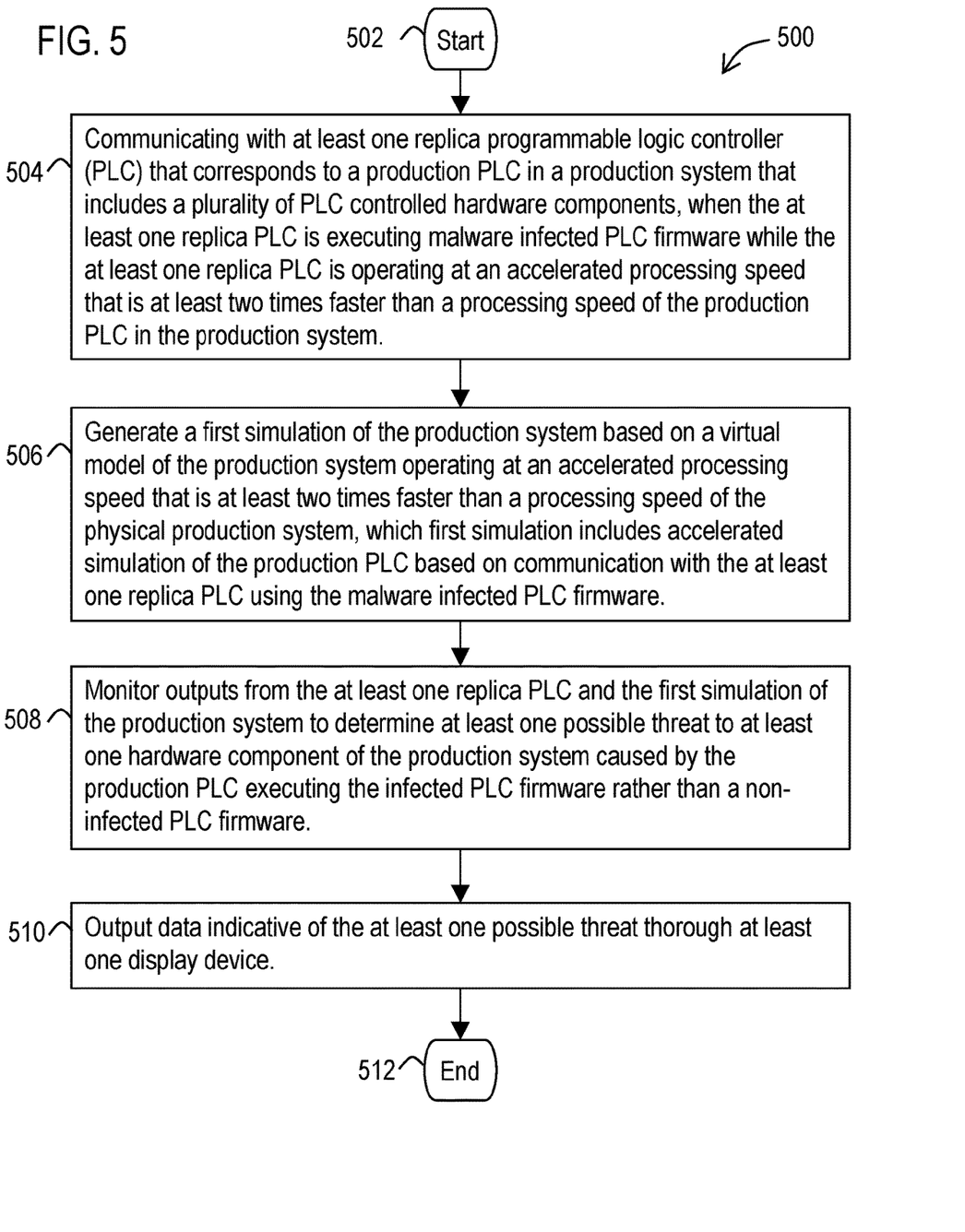
FIG. 5 illustrates a flow diagram of an example methodology that facilitates threat impact characterization.

With reference now to FIG. 5, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, hard disk drives, SSDs, flash memory, CDs, DVDs, and Blu-ray disks. The computer-executable instructions may include a routine, a sub-routine, programs, applications, modules, libraries, and/or the like. Still further, results of acts of the methodologies may be stored in a computer-readable medium, displayed on a display device, and/or the like.

Referring now to FIG. 5, a methodology 500 is illustrated that facilitates threat impact characterization. The methodology may start at 502 and may include several acts carried out through operation of at least one processor.

These acts may include an act 504 of communicating with at least one replica PLC that corresponds to a production PLC 122 in a production system 120 that includes a plurality of PLC controlled hardware components, when the at least one replica PLC is executing malware infected PLC firmware while the at least one replica PLC is operating at an accelerated processing speed that is at least two times faster than a processing speed of the production PLC in the production system. In addition, the methodology may include an act 506 of generating a first simulation of the production system based on a virtual model of the production system operating at an accelerated processing speed that is at least two times faster than a processing speed of the physical production system. The first simulation may include accelerated simulation of the production PLC based on communication with the at least one replica PLC using the malware infected PLC firmware. Also, the methodology may include an act 508 of monitoring outputs from the at least one replica PLC and the first simulation of the production system to determine at least one possible threat to at least one hardware component of the production system caused by the production PLC executing the infected PLC firmware rather than a non-infected PLC firmware. Further, the methodology may include an act 510 of outputting data indicative of the at least one possible threat thorough at least one display device. At 512 the methodology may end.

It should be appreciated that the methodology 500 may include other acts and features discussed previously with respect to the processing system 132. For example, the methodology may further include an act of injecting a forensic firmware code into the at least one replica PLC. The forensic firmware code may be configured to monitor and provide data to the at least one data processing system corresponding to at least one internal operation of the at least one replica PLC, without interfering with the operation of the infected PLC firmware. The at least one processor may use the data provided by the forensic firmware code to determine the at least one threat. In some examples, the at least one internal operation for which the forensic firmware code provides data to the at least one data processing system may include at least one of scan cycle time, jitter or any combination thereof.

The described methodology 500 may also include an act of extracting the infected PLC firmware from the production PLC and an act of loading the infected PLC firmware in the at least one replica PLC. In addition, the methodology may include determining and outputting data indicative thereof through the display device: a cyber-physical impact of the at least one possible threat on the production system; a timeline of the cyber-physical impact; one or more consequences of the cyber-physical impact; or any combination thereof.

In a further example, the methodology may include acts carried out through operation of the at least one data processing system of comparing historical process data streams captured from the production system to the data process streams produced by the first simulation to determine differences between the process data streams that are indicative of the at least one possible threat.

In addition, the methodology may include an act of overclocking a processor of the at least one replica PLC and employing a liquid cooling system with the PLC to enable the at least one replica PLC to operate at least two times the maximum processing speed of the PLC when cooled via air without a liquid cooling system.

The methodology may also include additional acts carried out through operation of the at least one data processing system. Such acts may include communicating with the at least one replica PLC when executing non-infected PLC firmware. These acts may also include generating a second simulation of the production system operating at the accelerated processing speed that includes accelerated simulations of the production PLC based on communication with the at least one replica PLC using the non-infected PLC firmware. Further, the acts may include carrying out at least one comparison including comparing the outputs from at least one of: the first simulation to the second simulation; the at least one replica PLC when using the infected PLC firmware and the non-infected PLC firmware; or a combination thereof. Also, the acts may include determining at least one difference in which at least one of the simulated production system, the at least one replica PLC, or a combination thereof operates between the first and second simulations, based on the at least one comparison. Further, the acts may include determining that the at least one hardware component in the production system is associated with possible damage caused by the infected PLC firmware, based on the determined at least one difference. Also, the outputted data indicative of the at least one possible threat may specify the at least one hardware component.

As discussed previously, acts associated with these methodologies (other than any described manual acts) may be carried out by one or more processors. Such processor(s) may be included in one or more data processing systems, for example, that execute software components (such as the described application software component) operative to cause these acts to be carried out by the one or more processors. In an example embodiment, such software components may comprise computer-executable instructions corresponding to a routine, a sub-routine, programs, applications, modules, libraries, a thread of execution, and/or the like. Further, it should be appreciated that software components may be written in and/or produced by software environments/languages/frameworks such as Java, JavaScript, Python, C, C#, C++ or any other software tool capable of producing components and graphical user interfaces configured to carry out the acts and features described herein.

Figure 6:
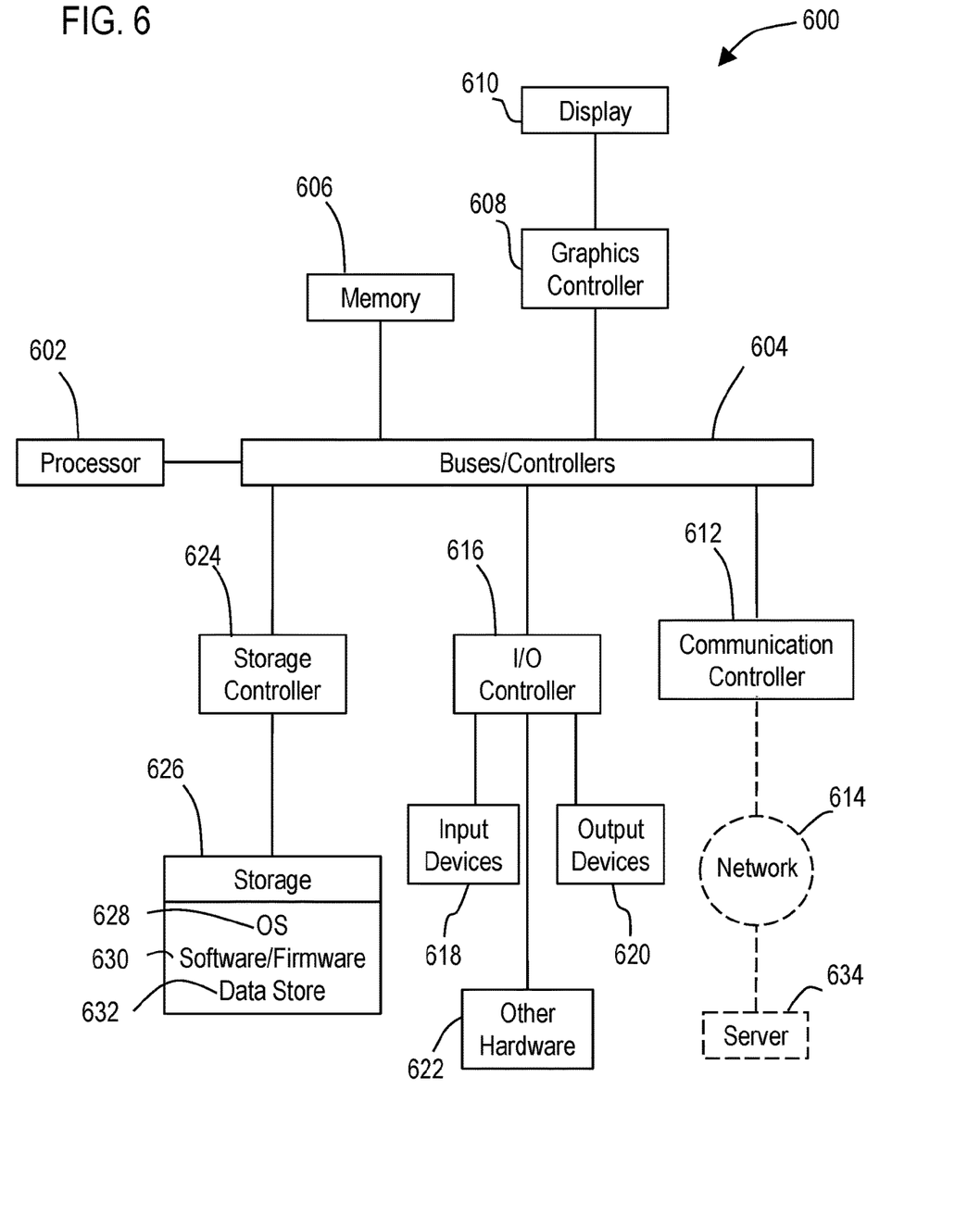
FIG. 6 illustrates a block diagram of a data processing system in which an embodiment may be implemented.

FIG. 6 illustrates a block diagram of a data processing system 600 (also referred to as a computer system) in which embodiments of the previously describe data processing systems may be implemented. The data processing system depicted includes at least one processor 602 (e.g., a CPU) that may be connected to one or more bridges/controllers/buses 604 (e.g., a north bridge, a south bridge). One of the buses 604, for example, may include one or more I/O buses such as a PCI Express bus. Also connected to various buses in the depicted example may include a main memory 606 (RAM) and a graphics controller 608. The graphics controller 608 may be connected to one or more display devices 610. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 612 (Ethernet controllers, WiFi controllers, cellular controllers) operative to connect to a local area network (LAN), Wide Area Network (WAN), a cellular network, and/or other wired or wireless networks 614 or communication equipment.

Further components connected to various busses may include one or more I/O controllers 616 such as USB controllers, Bluetooth controllers, and/or dedicated audio controllers (connected to speakers and/or microphones). It should also be appreciated that various peripherals may be connected to the I/O controller(s) (via various ports and connections) including input devices 618 (e.g., keyboard, mouse, pointer, touch screen, touch pad, drawing tablet, trackball, buttons, keypad, game controller, gamepad, camera, microphone, scanners, motion sensing devices that capture motion gestures), output devices 620 (e.g., printers, speakers) or any other type of device that is operative to provide inputs to or receive outputs from the data processing system. Also, it should be appreciated that many devices referred to as input devices or output devices may both provide inputs and receive outputs of communications with the data processing system. For example, the processor 602 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 622 connected to the I/O controllers 616 may include any type of device, machine, or component that is configured to communicate with a data processing system.

Additional components connected to various busses may include one or more storage controllers 624 (e.g., SATA). A storage controller may be connected to a storage device 626 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 604 such as a PCI Express bus.

A data processing system in accordance with an embodiment of the present disclosure may include an operating system 628, software/firmware 630, and data stores 632 (that may be stored on a storage device 626 and/or the memory 606). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 612 may be connected to the network 614 (not a part of data processing system 600), which can be any public or private data processing system network or combination of networks, as known to those of skill in the art, including the Internet. Data processing system 600 can communicate over the network 614 with one or more other data processing systems such as a server 634 (also not part of the data processing system 600). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 602 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 600 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In another example, such a client device may correspond to a computer running a web browser or thin client application. Inputs from the user may be transmitted from the web browser or thin client application to be evaluated on the server, rendered by the server, and an image (or series of images) sent back to the client computer to be displayed by the web browser or thin client application. Also in some examples, the remote processor described herein may correspond to a combination of a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 600 may conform to any of the various current implementations and practices known in the art.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean: that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for threat impact characterization comprising:
at least one replica programmable logic controller (PLC) that corresponds to a production PLC in a production system that includes a plurality of PLC controlled hardware components, and which at least one replica PLC is configured to operate at an accelerated processing speed that is at least two times faster than a processing speed of the production PLC in the production system, at least one data processing system, including at least one hardware processor configured to: communicating with the at least one replica PLC when executing malware infected PLC firmware; generate a first simulation of the production system based on a virtual model of the production system operating at an accelerated processing speed that is at least two times faster than a processing speed of the physical production system, which first simulation includes accelerated simulation of the production PLC based on communication with the at least one replica PLC using the malware infected PLC firmware; monitor outputs from the at least one replica PLC and the first simulation of the production system to determine at least one threat to at least one hardware component of the production system caused by the production PLC executing the infected PLC firmware rather than a non-infected PLC firmware; and output data indicative of the at least one threat thorough at least one display device.

2. The system according to claim 1, wherein the at least one replica PLC includes a forensic firmware code injected into the at least one replica PLC, which forensic firmware code is configured to monitor and provide data to the at least one data processing system corresponding to at least one internal operation of the at least one replica PLC, without interfering with the operation of the infected PLC firmware, wherein the at least one hardware processor is configured to use the data provided by the forensic firmware code to determine the at least one threat, wherein the at least one internal operation for which the forensic firmware code provides data to the at least one data processing system includes at least one of scan cycle time, jitter or any combination thereof.

3. The system according to claim 1, wherein the at least one hardware processor is configured to determine and output data indicative thereof through the at least one display device: a cyber-physical impact of the at least one threat on the production system; a timeline of the cyber-physical impact; one or more consequences of the cyber-physical impact; or any combination thereof.

4. The system according to claim 1, wherein the at least one hardware processor is configured to compare historical process data streams captured from the production system to the data process streams produced by the first simulation to determine differences between the process data streams that are indicative of the at least one threat.

5. The system according to claim 1, wherein the at least one replica PLC corresponds to a PLC having a processor that is overclocked and that includes a liquid cooling system to enable the at least one replica PLC to operate at least two times the maximum processing speed of the PLC when cooled via air without a liquid cooling system.

6. The system according to claim 1, wherein the production system corresponds to a power grid, wherein the hardware components include at least one of a transformer.

7. The system according to claim 1, wherein the at least one data processing system is configured to: communicate with the at least one replica PLC when executing non-infected PLC firmware; generate a second simulation of the production system operating at the accelerated processing speed that includes accelerated simulations of the production PLC based on communication with the at least one replica PLC using the non-infected PLC firmware; carry out at least one comparison including comparing the outputs from at least one of:
the first simulation to the second simulation; the at least one replica PLC when using the infected PLC firmware and the non-infected PLC firmware; or a combination thereof;
determine at least one difference in which at least one of the simulated production system, the at least one replica PLC, or a combination thereof operates between the first and second simulations, based on the at least one comparison; and
determine that the at least one hardware component in the production system is associated with possible damage caused by the infected PLC firmware, based on the determined at least one difference, wherein the outputted data indicative of the at least one threat specifies the at least one hardware component.

8. A method for threat impact characterization comprising:
through operation of at least one hardware processor of at least one data processing system: communicating with at least one replica programmable logic controller (PLC) that corresponds to a production PLC in a production system that includes a plurality of PLC controlled hardware components, when the at least one replica PLC is executing malware infected PLC firmware while the at least one replica PLC is operating at an accelerated processing speed that is at least two times faster than a processing speed of the production PLC in the production system;
generating a first simulation of the production system based on a virtual model of the production system operating at an accelerated processing speed that is at least two times faster than a processing speed of the physical production system, which first simulation includes accelerated simulation of the production PLC based on communication with the at least one replica PLC using the malware infected PLC firmware; monitoring outputs from the at least one replica PLC and the first simulation of the production system to determine at least one threat to at least one hardware component of the production system caused by the production PLC executing the infected PLC firmware rather than a non-infected PLC firmware;
and outputting data indicative of the at least one threat thorough at least one display device.

9. The method according to claim 8, further comprising:
injecting a forensic firmware code into the at least one replica PLC, which forensic firmware code is configured to monitor and provide data to the at least one data processing system corresponding to at least one internal operation of the at least one replica PLC, without interfering with the operation of the infected PLC firmware, wherein the at least one hardware processor uses the data provided by the forensic firmware code to determine the at least one threat, wherein the at least one internal operation for which the forensic firmware code provides data to the at least one data processing system includes at least one of scan cycle time, jitter or any combination thereof.

10. The method according to claim 8, further comprising:
extracting the infected PLC firmware from the production PLC;
loading the infected PLC firmware in the at least one replica PLC; and
determining and outputting data indicative thereof through the at least one display device:
a cyber-physical impact of the at least one threat on the production system;
a timeline of the cyber-physical impact; one or more consequences of the cyber-physical impact; or any combination thereof.

11. The method according to claim 8, further comprising through operation of the at least one data processing system comparing historical process data streams captured from the production system to the data process streams produced by the first simulation to determine differences between the process data streams that are indicative of the at least one threat.

12. The method according to claim 8, further comprising overclocking a processor of the at least one replica PLC and employing a liquid cooling system with the PLC to enable the at least one replica PLC to operate at least two times the maximum processing speed of the PLC when cooled via air without a liquid cooling system.

13. The method according to claim 8, wherein the production system corresponds to a power grid, wherein the hardware components include a transformer.

14. The method according to claim 8, further comprising through operation of the at least one data processing system:
communicating with the at least one replica PLC when executing non-infected PLC firmware; generating a second simulation of the production system operating at the accelerated processing speed that includes accelerated simulations of the production PLC based on communication with the at least one replica PLC using the non-infected PLC firmware carrying out at least one comparison including comparing the outputs from at least one of: the first simulation to the second simulation; the at least one replica PLC when using the infected PLC firmware and the non-infected PLC firmware; or a combination thereof;
determining at least one difference in which at least one of the simulated production system, the at least one replica PLC, or a combination thereof operates between the first and second simulations, based on the at least one comparison; and
determining that the at least one hardware component in the production system is associated with damage caused by the infected PLC firmware, based on the determined at least one difference, wherein the outputted data indicative of the at least one threat specifies the at least one hardware component.

15. A non-transitory computer readable medium encoded with executable instructions that when executed, cause at least one hardware processor to carry out a method for threat impact characterization comprising:
communicating with at least one replica programmable logic controller (PLC) that corresponds to a production PLC in a production system that includes a plurality of PLC controlled hardware components, when the at least one replica PLC is executing malware infected PLC firmware while the at least one replica PLC is operating at an accelerated processing speed that is at least two times faster than a processing speed of the production PLC in the production system;
generating a first simulation of the production system based on a virtual model of the production system operating at an accelerated processing speed that is at least two times faster than a processing speed of the physical production system, which first simulation includes accelerated simulation of the production PLC based on communication with the at least one replica PLC using the malware infected PLC firmware;
monitoring outputs from the at least one replica PLC and the first simulation of the production system to determine at least one threat to at least one hardware component of the production system caused by the production PLC executing the infected PLC firmware rather than a non-infected PLC firmware; and
outputting data indicative of the at least one threat thorough at least one display device.

16. The non-transitory computer readable medium according to claim 15, further comprising:
injecting a forensic firmware code into the at least one replica PLC, which forensic firmware code is configured to monitor and provide data to the at least one data processing system corresponding to at least one internal operation of the at least one replica PLC, without interfering with the operation of the infected PLC firmware, wherein the at least one hardware processor uses the data provided by the forensic firmware code to determine the at least one threat, wherein the at least one internal operation for which the forensic firmware code provides data to the at least one data processing system includes at least one of scan cycle time, jitter or any combination thereof.

17. The non-transitory computer readable medium according to claim 15, further comprising:
- extracting the infected PLC firmware from the production PLC;
- loading the infected PLC firmware in the at least one replica PLC; and
- determining and outputting data indicative thereof through the at least one display device:
- a cyber-physical impact of the at least one threat on the production system;
- a timeline of the cyber-physical impact; one or more consequences of the cyber-physical impact; or any combination thereof.

18. The non-transitory computer readable medium according to claim 15, further comprising comparing historical process data streams captured from the production system to the data process streams produced by the first simulation to determine differences between the process data streams that are indicative of the at least one threat.

19. The non-transitory computer readable medium according to claim 15, further comprising overclocking a processor of the at least one replica PLC and employing a liquid cooling system with the PLC to enable the at least one replica PLC to operate at least two times the maximum processing speed of the PLC when cooled via air without a liquid cooling system.

20. The non-transitory computer readable medium according to claim 15, wherein the production system corresponds to a power grid, wherein the hardware components include a transformer.

21. The non-transitory computer readable medium according to claim 15, further comprising: communicating with the at least one replica PLC when executing non-infected PLC firmware; generating a second simulation of the production system operating at the accelerated processing speed that includes accelerated simulations of the production PLC based on communication with the at least one replica PLC using the non-infected PLC firmware carrying out at least one comparison including comparing the outputs from at least one of: the first simulation to the second simulation; the at least one replica PLC when using the infected PLC firmware and the non-infected PLC firmware; or a combination thereof; determining at least one difference in which at least one of the simulated production system, the at least one replica PLC, or a combination thereof operates between the first and second simulations, based on the at least one comparison; and determining that the at least one hardware component in the production system is associated with damage caused by the infected PLC firmware, based on the determined at least one difference, wherein the outputted data indicative of the at least one threat specifies the at least one hardware component.

* * * * *